United States Patent
Wolf

(10) Patent No.: US 10,673,844 B2
(45) Date of Patent: Jun. 2, 2020

(54) METHOD FOR PROVIDING AN ACCESS CODE ON A PORTABLE DEVICE AND PORTABLE DEVICE

(71) Applicant: BUNDESDRUCKEREI GMBH, Berlin (DE)

(72) Inventor: Andreas Wolf, Jena (DE)

(73) Assignee: Bundesdruckerei GMBH, Berlin (DE)

(*) Notice: Subject to any disclaimer, the term of this patent is extended or adjusted under 35 U.S.C. 154(b) by 90 days.

(21) Appl. No.: 15/524,916

(22) PCT Filed: Nov. 5, 2015

(86) PCT No.: PCT/DE2015/100469
§ 371 (c)(1),
(2) Date: May 5, 2017

(87) PCT Pub. No.: WO2016/070872
PCT Pub. Date: May 12, 2016

(65) Prior Publication Data
US 2017/0324735 A1    Nov. 9, 2017

(30) Foreign Application Priority Data
Nov. 6, 2014  (DE) .................... 10 2014 116 183

(51) Int. Cl.
*H04L 29/06*    (2006.01)
*G06F 21/32*    (2013.01)
(Continued)

(52) U.S. Cl.
CPC .......... *H04L 63/0853* (2013.01); *G06F 21/31* (2013.01); *G06F 21/32* (2013.01);
(Continued)

(58) Field of Classification Search
CPC ........ G06F 21/30; G06F 21/44; G06F 21/445; G06F 21/62; G06F 21/6209; G06F 21/32;
(Continued)

(56) References Cited

U.S. PATENT DOCUMENTS 6,748,061 B2 *  6/2004  Ahlstrom ............. H04M 11/025
                                                      379/102.01
8,943,187 B1 *  1/2015  Saylor ................. G06F 21/6209
                                                      709/223
(Continued)

FOREIGN PATENT DOCUMENTS

| DE | 102005059001 A1 | 6/2007 | |
| GB | 2417858 A * | 3/2006 | ......... G07C 9/00087 |
| WO | WO-2010-112586 A1 | 10/2010 | |

OTHER PUBLICATIONS

International Search Report (in English and German) and Written Opinion of the International Searching Authority (in German) issued in PCT/DE2015/100469, dated Mar. 29, 2016; ISA/EP.

*Primary Examiner* — Saleh Najjar
*Assistant Examiner* — Khalid M Almaghayreh
(74) *Attorney, Agent, or Firm* — Harness Dickey

(57) ABSTRACT

The disclosure relates to a method for providing an access code on a portable device, which comprises a user interface and is set up for a wireless data communication, in which reference data for an authentication are stored in a central data processing system, wherein the reference data comprise personal data containing biometric reference data for a user of the portable device and a device identifier for the portable device, in response to a detected event, an authentication process is executed, in which the user is authenticated, wherein to authenticate the user, in the central data processing system and/or in the portable device, the reference data and authentication data are evaluated, which comprise personal authentication data for the user, including biometric (Continued)

Figure 1:
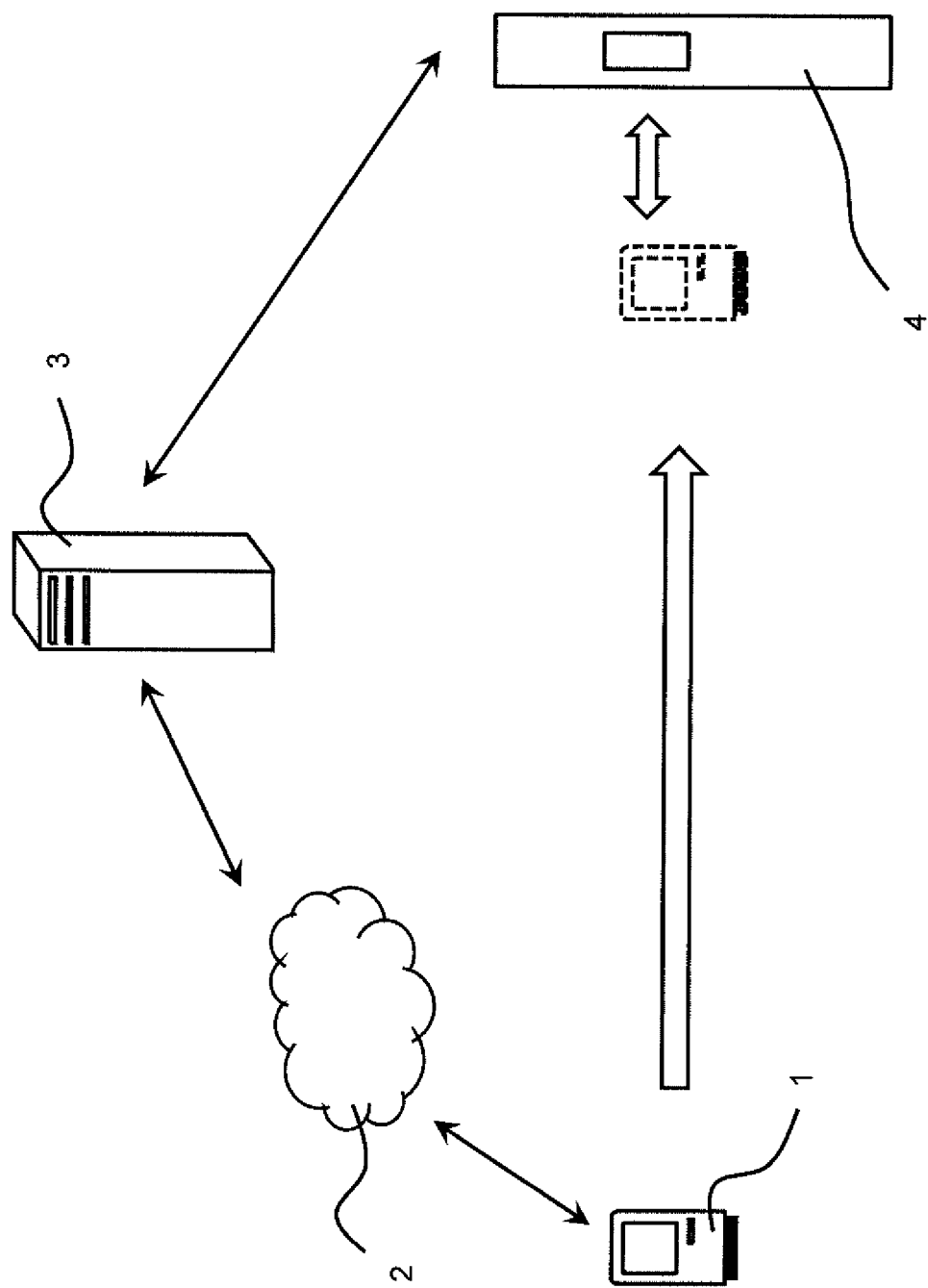

authentication data, and an authentication device identifier for the portable device, and in response to a successful authentication, an access code is provided in the portable.

9 Claims, 2 Drawing Sheets

(51) Int. Cl.
| | |
|---|---|
| *H04W 12/08* | (2009.01) |
| *H04L 9/32* | (2006.01) |
| *G06F 21/31* | (2013.01) |
| *H04W 4/80* | (2018.01) |
| *H04W 4/029* | (2018.01) |
| *G06F 21/34* | (2013.01) |
| *H04W 12/06* | (2009.01) |

(52) U.S. Cl.
CPC ............ *H04L 9/3231* (2013.01); *H04L 63/08* (2013.01); *H04L 63/0861* (2013.01); *H04L 63/0876* (2013.01); *H04W 12/08* (2013.01); *G06F 21/34* (2013.01); *H04L 2209/80* (2013.01); *H04W 4/029* (2018.02); *H04W 4/80* (2018.02); *H04W 12/06* (2013.01)

(58) Field of Classification Search
CPC ............ G06F 2221/2141; H04L 63/08; H04L 63/101; H04L 63/0861; H04L 9/32; H04L 9/0866; H04L 9/323; H04L 29/06823; H04L 29/06829; H04L 29/06809
USPC ............ 726/2, 21, 27–28, 34; 713/155, 182
See application file for complete search history.

(56) References Cited

U.S. PATENT DOCUMENTS

| | | | | |
|---|---|---|---|---|
| 2007/0197261 | A1* | 8/2007 | Humbel | G06Q 30/00 455/558 |
| 2007/0198436 | A1* | 8/2007 | Weiss | G06F 21/32 705/75 |
| 2009/0132655 | A1* | 5/2009 | Behrens | G06F 21/6218 709/204 |
| 2009/0324025 | A1* | 12/2009 | Camp, Jr. | G07C 9/00007 382/124 |
| 2010/0093429 | A1* | 4/2010 | Mattice | G07F 1/06 463/25 |
| 2011/0205016 | A1* | 8/2011 | Al-Azem | G06F 21/32 340/5.52 |
| 2012/0169461 | A1* | 7/2012 | Dubois, Jr. | G07C 9/00309 340/5.61 |
| 2013/0098995 | A1* | 4/2013 | Jurek | G06Q 20/3223 235/380 |
| 2013/0214902 | A1* | 8/2013 | Pineau | H04W 4/90 340/5.61 |
| 2013/0262873 | A1 | 10/2013 | Read et al. | |
| 2013/0326614 | A1* | 12/2013 | Truskovsky | G06F 21/44 726/19 |
| 2014/0002236 | A1* | 1/2014 | Pineau | G06F 21/32 340/5.6 |
| 2014/0122114 | A1* | 5/2014 | Wesley | G06Q 20/18 705/2 |
| 2014/0230026 | A1* | 8/2014 | Forero | H04W 12/08 726/5 |
| 2016/0028717 | A1* | 1/2016 | Apeldorn | G06Q 30/0621 726/9 |
| 2016/0112871 | A1* | 4/2016 | White | H04W 12/06 726/4 |
| 2016/0248782 | A1* | 8/2016 | Troesch | G07C 9/00007 |
| 2018/0004928 | A1* | 1/2018 | Hayashi | G06F 21/41 |
| 2019/0197801 | A1* | 6/2019 | Prasad | G07C 9/00309 |

* cited by examiner

METHOD FOR PROVIDING AN ACCESS CODE ON A PORTABLE DEVICE AND PORTABLE DEVICE

CROSS REFERENCE TO RELATED APPLICATIONS

This application is a U.S. National Phase Application under 35 U.S.C. 371 of International Application No. PCT/DE2015/100469 filed on Nov. 5, 2015 and published in German as WO 2016/070872 A1 on May 12, 2016. This application claims the benefit of priority from German Patent Application No. 10 2014 116 183.1 filed Nov. 6, 2014. The entire disclosures of all of the above applications are incorporated herein by reference.

The present disclosure relates to a method for providing an access code on a portable device and to a portable device.

BACKGROUND

In connection with a wide range of applications, the need exists for controlling access by persons to a particular location, be it, for example, a business or company premises, or an event hall. Known access control systems work, for example, on the basis of cards, which means that authorized persons are provided with a card, for example a chip card or a card with a magnetic strip or a printed bar code, which can be evaluated by an access control device in order to check the access authorization of the card user. In this way, a property-based access control can be combined, for example, with a knowledge-based access control, for example a personal identification number which is stored on the card or in a database and the input of which is evaluated by the access control device.

It is also known to use biometric methods (person-based control). In this way, complex verification scenarios can be implemented for the access control by means of the access card.

The verification in the different systems is carried out directly at the access control point in an appropriate form, by information stored on the access card being read out, for example, by means of a magnetic stripe reader, contact-based or contactless smart card, barcode reader or, a similar device.

In the known access control systems, the actions directly related to the access control can be completed by the user of the access card directly at the control point.

This can lead to queues forming at access systems and associated waiting times for the persons seeking access, for example at peak times at a company entrance, or else at the access gate of an event venue such as a stadium or concert hall.

Document WO 2010/112586 A1 discloses a method for access control. Using a mobile telephone, an identification code is sent to an access node. If the identification code is recognized as valid, the access node sends an access code to the mobile telephone which is then displayed on a screen of the mobile phone. A camera is used to scan the access code and, if the access code is recognized as valid, access is granted.

A method and a system for authentication is disclosed in US 2013/0262873 A1. A code key is transmitted to a mobile device belonging to a user. By means of the code key, a communication between the mobile device and a server can be encrypted. Biometric data of the user are transmitted to the server. The server defines a biometric model of the user for future authentication. An encrypted biometric model is stored in the mobile device.

SUMMARY

It is an object of the invention to specify a method for providing an access code on a portable device and a portable device which, while ensuring a high security standard, facilitate a simple, time-saving and user-friendly processing of the access control.

The object is achieved by a method for providing an access code on a portable device according to the independent claim 1. The claim 10 relates to a portable device. Advantageous configurations of the invention are the subject matter of dependent claims.

According to one aspect, a method for providing an access code on a portable device is created, which comprises a user interface and is set up for a wireless data communication. Via the user interface, the user of the portable device is enabled, in particular, to enter data. The user interface can comprise a keyboard and/or a touch screen. The portable device can be, for example, a mobile telephone, a tablet computer or a portable personal computer. In the method for providing the access code, reference data for an authentication are stored in a central data processing system. A data communication between the portable device and the central data processing system is facilitated by using wireless data communication, for example over a mobile phone network. The reference data stored in the central data processing system comprise personal data containing biometric reference data for a user of the portable device as well as a device identifier for the portable device. In the method, as a response to a detected event, an authentication process is started in which the user is authenticated. For the purpose of user authentication, the reference data and authentication data are evaluated in the central data processing system and/or in the portable device. The evaluation can comprise a comparison of reference data and authentication data. The authentication data contain personal authentication data for the user, including biometric authentication data, as well as an authentication device identifier for the portable device. As a response to the successful authentication of the user, an access code is provided in the portable device, which access code can be evaluated by an access control device to determine an access authorization of the user if the user desires access.

According to a further aspect, a portable device having a user interface and a communication module for wireless data communication is provided, which is set up to provide the access code by means of a software application installed on the portable device for use with the method.

For transferring or exchanging electronic data, in the method, a secure data channel can be implemented between the mobile device and the central data processing system for a desired time. Such a secure data channel can be used in accordance with the security standard of the access control system for a secure data communication between the portable device and the central data processing system.

If the portable device is a mobile telephone, for example, then, for example, the so-called IMEI number (IMEI—The International Mobile Equipment Identity) can be used as a device identifier for the method. A device identifier individualizing a device in a network system can be valid either on a network-wide basis or else only locally in a part of the network.

For provision on the portable device, the access code can be generated either in the portable device itself and/or in the central data processing system. In the case where it is generated in the central data processing device, the access code is then transmitted to the portable device, where it is provided either in the form as transmitted or in a modified form, for example for output via a display.

The inclusion of biometric data for identifying persons enables a personalized access control with a high security standard.

The authentication of the user and the provision of the access code on the portable device take place before the user reaches the location of the access control device, such that on reaching the access control location, the user is prepared to present the access code to the access control device on the portable device immediately and without delay. This enables, for example, waiting times to be avoided for persons requiring access at an access control device.

The authentication process can be started by means of an application running on the portable device if at least one event from the following group of events is detected: reaching a predetermined location and reaching a predetermined time. The application running on the portable device can be implemented as a software module which is downloaded onto the portable device and installed there. If the application detects one of the triggering events, the authentication process can be started either immediately or with a time offset relative to the detection of the event. It may be provided that the application detects a confirmation of the portable device by the user and only thereafter initiates the authentication process. With the aid of the application, the user can specify, for example, a city or a company premises as a predetermined location, so that the authentication process can be started when the portable device reaches the city or the company premises, or enters a given locality near to them. It can be provided that the portable device is used to detect signals that can only be received in the vicinity of the location for which the access control is implemented. Such a selection of signals can be achieved, for example, by the use of selected frequency ranges and/or a limited range of the signals transmitted. In connection with reaching a predetermined time, this can involve, for example, a day or a time of day, the reaching of which can be verified and detected using a time module of the portable device. The application can also start as a response to optical visibility of signals, for example after scanning a particular QR code from the wall of a building, for example using the mobile phone's camera. In this case, the authentication process can start as a response to a user action on the portable device.

To determine the arrival at the predetermined location, electronic information of a localization system of the portable device can be evaluated. For example, the portable device can comprise a GPS module (GPS—Global Positioning System), with which it is possible to determine the current location of the portable device. This electronic information can then be used by the application running on the portable device to determine whether the authentication process should be started.

The personal authentication data for the user, including the biometric authentication data, can be acquired at least partly by means of one or a plurality of function modules of the portable device. In the different configurations, the biometric reference data and the biometric authentication data can comprise one or a plurality of types of biometric data and/or information derived therefrom, for example, a fingerprint, an iris image and/or an image of the face. Other methods include the use of signature recognition and/or a doodle drawing. Alternatively or additionally, a voice sample can be used for the authentication. The biometric data can be acquired partially or exclusively by means of the portable device, which for this purpose is provided with relevant functional modules, for example, a fingerprint sensor, a camera and/or a touchsensitive display.

The access code can be output via an output device of the portable device. It can be provided that the access code, for example a stripe code or a QR-code or other 2D barcode, is output via a display device of the portable device. Alternatively or additionally, the access code can be stored on a memory component of the portable device in such a way as to enable in particular a contactless reading by means of an associated reader device of the access control system. For this purpose, for example, RFID technology (RFID—Radio Frequency Identification) can be used. The output facilitates, in general, a presentation of the access code provided after successful authentication to the access control device.

The access code can be presented to the access control device using NFC communication (NFC—Near Field Communication).

The access code can be provided as an access code having a time-limited validity period. The temporal limitation of the validity period may, for example, consist in the access code provided in the portable device expiring after a predetermined time period. It can also be provided that the access code only becomes valid at a time in the future which is later than the time of provision. It may be provided that after the expiry of the validity period, the access code is automatically deleted or rendered invalid by the application on the portable device.

The access code can be provided as a location-restricted access code, which loses its validity if it is detected, in particular by the application on the portable device, that the portable device departs from a given locality after the provision of the access code. For example, if the portable device leaves a specified locality, for example a city, a part of the city or a company premises after the provision of the access code, then the application can be set up on detection of this event to delete the provided access code, or otherwise render it invalid, at a later date. This can involve, for example, evaluating the location information of a GPS module of the portable device.

A part of the biometric authentication data can be acquired by means of an on-site sensor device on the access control device. A previously started and not yet completed authentication process can be concluded and terminated by means of biometric data acquired in this way. In this embodiment also, the authentication process is started before the portable device reaches the location of the access control device. In the case of increased security requirements, with this design an extended data acquisition and evaluation can be provided.

DESCRIPTION OF EMBODIMENTS

Figure 2:
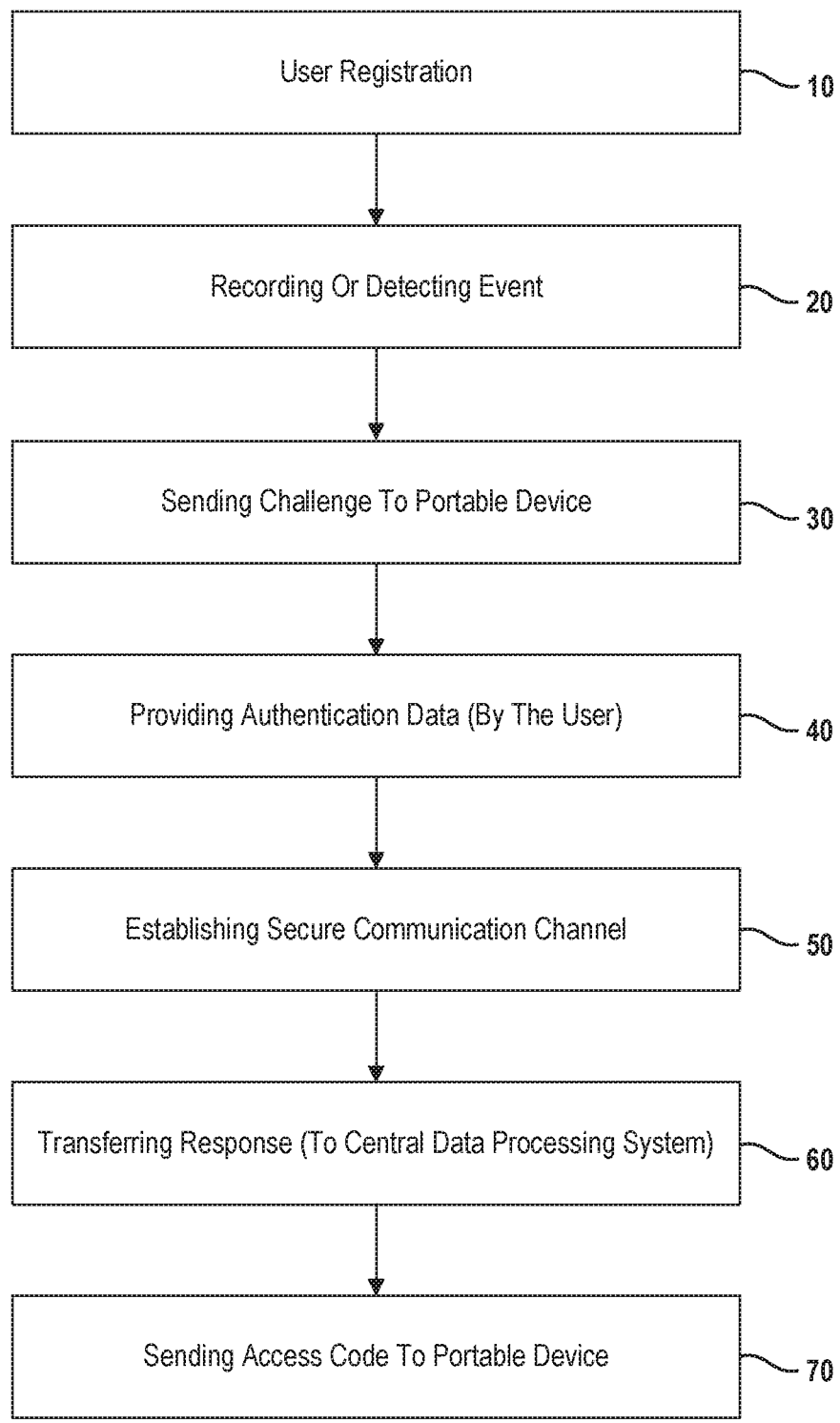

In the following, further embodiments are described with reference to figures. The figures show:

FIG. 1 a schematic illustration of access control and
FIG. 2 a flow chart for a method for providing an access code on a portable device.

FIG. 1 shows a schematic view illustrating an access control system. A user is provided with a portable device 1, which via a wireless communication network 2, for example a mobile phone network, can exchange electronic data with a central data processing system 3 which is formed, for example, by a server. The central data processing system 3 is part of an access control system, for example in connection with a company premises or a sports or event arena.

On the portable device 1, the user is provided with an access code which the user can then present to an access control device 4 when the user with the portable device 1 arrives at the location of the access control device 4. The method for providing the access code in the exemplary embodiment shown has already been started at a remote location such that the access code is available on the portable device 1 when the user with the portable device 1 arrives at the access control device 4.

In the following, further aspects of the method for providing the access code on the portable device 1 are explained with reference to the flow diagram in FIG. 2.

The portable device 1 can be a network-enabled IT device that a user already owns for other reasons (BYOD—bring your own device), for example a mobile phone, in particular a so-called smartphone. The portable device 1 is running an application (software application) which can wirelessly establish contact and exchange data with the central data processing system 3 via the communication network 2. This application is distributed in advance, for example it can be available either on the internet or for download. A smartphone is also normally associated with a person and its ownership can itself be used as an authentication factor.

After the installation of the application on the portable device 1, the user registers on the central data processing system 3 (step 10 in FIG. 2). In this process, electronic keys for providing secure communication can be exchanged and necessary personal data and the IMEI of the IT device can be registered. Depending on the desired level of security, the reference data required for the authentication procedure used are acquired via the portable device 1 or else in the central data processing system 3. For example, facial image data for a face recognition can be recorded live by the user and can then be saved in a quality-assured manner. These data can also be acquired, for example, from the passport of the user, or electronic images are already available in an employee database.

If someone seeks access to an environment secured by means of an access control system or is known/suspected to wish to do so in the near future, an authentication process is started by the application on the portable device 1. Before the triggering of the authentication process, an event is recorded or detected (step 20).

In the authentication process, a so-called challenge is sent to the portable device 1, either on request or automatically (step 30). Thus, every morning a company employee could receive such a challenge sent to his portable device 1. Alternatively (e.g. in the case of visitors), the challenge could be transferred in a visitor centre, for example via 3D barcode.

The challenge can be person specific and/or time specific, i.e. only valid for a specific user and for a specified period of time. If the personal reference is omitted, which would lead to a restriction of the security function but for some applications is tolerable, the challenge can be available on a time-dependent (and not person-dependent) basis in the approach to the access control point and be automatically determined by the portable device 1. In this case, for example, electronic signals of a GPS sensor and/or time information can be evaluated in the portable device 1. Also, the application running on the portable device 1 could cause the user thereof to scan a bar code (QR, Datamatrix, Aztec, etc.).

The challenge is already available on the portable device 1 before the user arrives at the access control device 4. For example, a QR code can already be scanned before the control point is reached, if it is displayed large enough on any wall or on displays distributed attractively about the premises.

If the challenge is available, the application on the portable device 1 requests the user to perform the authentication. To this end, the user supplies authentication data in (step 40). The user records, for example, an image of their face, a fingerprint, a voice sample and/or other biometric data, such as a signature or doodle drawing. Alternatively, they enter a secret code, such as a passphrase. Alternatively, they place an NFC card onto the portable device 1. Combinations of these factors are also possible. The portable device 1 establishes a secure communication channel to the central data processing system 3 (step 50) and transfers to the latter a response determined on the basis of the challenge and of characteristic data of the portable device 1, such as the IMEI of the portable device 1 (response, step 60). In addition, the portable device 1 transmits the authentication data previously collected for the authentication, which in the case of biometric techniques, for example, also includes feature data extracted therefrom.

It is possible to carry out the verification on the portable device 1 and/or in the central data processing system 3, in particular, depending on the level of security to be achieved. In the event of failure of a biometric verification, this can be repeated.

After a successful verification of the response and the transmitted authentication data, the central data processing system 3 sends an access code to the portable device 1 (step 70), wherein the code is preferably valid for a certain time, for example one day.

All that now remains is the verification of this access code at the control point by the access control device 4, which is effected, for example, by presentation of a 2D barcode to the access control device 4. Presentation via NFC is also possible.

The security properties of such a process and its implementation can be scaled in accordance with the application-specific requirements. The actual check at the control point then only involves the evaluation of the access code, such as a barcode or stripe code. Also, when extending the system to other authentication methods, there are no hardware changes required at the control point.

If the system is initially only bound to the portable device 1, in particular a mobile phone, or the possession of the same, in one embodiment, the access-authorizing code, for example a barcode, can be transmitted as soon as the challenge is answered by the correct portable device 1. This code is presented at the access control point. Later, however, a decision may be made to additionally use face detection. Now, the response to the challenge also includes the transmission of biometric data (image or feature vector). At the access control point itself, as before, only the presentation of the code is required. Further, subsequently retrofitted sensors and/or hardware tokens (such as an NFC card or similar) therefore no longer require changes at the access control point itself.

If an area with specific security requirements is to be secured for which the sensor equipment cannot be practically integrated into a mobile device, or if this is not advisable due to security considerations (manipulation protection), then additional devices can be installed at the access control point, for example an iris sensor or a hand-vein sensor. For the authentication schemes to be performed on these devices, the access code supplies at least one "claimed ID" of the user such that, in this case as well, no specific token has to be output and the system still runs in verification mode (1:1 search in the database on the basis of the claimed ID) and no identification (1:N search) is required.

The time-intensive interactive part of a control process, which can lead to queues forming at the access control device 4, is reduced to a minimum or even completely eliminated. This enables a high throughput with a small number of control points while maintaining the required security level. The control process is made smoother and large parts of it can be done by the user in advance. It is not necessary to issue a physical credential, which may be lost. A personal link can optionally be included, for example via face recognition, without the need for additional cameras or other hardware at the control point. In general, the attainable security level is highly scalable.

The features disclosed in this specification, the figures and/or the claims may be material for realization of various embodiments, taken in isolation or in various combinations thereof.

The invention claimed is:

1. A method for providing a location-restricted access code on a portable device, which comprises a user interface and is set up for a wireless data communication, in which
reference data for an authentication are stored in a central data processing system, wherein the reference data comprise personal data containing biometric reference data for a user of the portable device and a device identifier for the portable device;
in response to a detected event, an authentication process is executed, in which the user is authenticated, wherein to authenticate the user, in the central data processing system and/or in the portable device, the reference data and authentication data are evaluated, which comprise personal authentication data for the user, including biometric authentication data, and an authentication device identifier for the portable device;
in response to a successful authentication, a location-restricted access code is provided in the portable device, wherein the location-restricted access code is newly generated after each successful authentication;
evaluate the location-restricted access code by an access control device to determine an access authorization of the user to a particular physical locality, wherein the access authorization is independent from a communication link with a network at the particular physical locality; and
after a successful authentication at the particular locality and in response to detecting that the portable device departs from the particular physical locality, terminating validity of the location-restricted access code.

2. The method according to claim 1, wherein the authentication process is started by means of an application running on the portable device, if at least one event from the following group of events is detected: reaching a predetermined location and reaching a predetermined time.

3. The method according to claim 2, wherein to determine the reaching of the predetermined location, electronic information of a localization device of the portable device are evaluated.

4. The method according to claim 1, wherein the personal authentication data for the user, including the biometric authentication data, are acquired at least partly by means of one or a plurality of function modules of the portable device.

5. The method according to claim 1, wherein the location-restricted access code is issued via an output device of the portable device.

6. The method according to claim 1, wherein the location-restricted access code is presented to the access control device using NFC communication.

7. The method according to claim 1, wherein the location-restricted access code is provided as an access code having a time-limited validity period.

8. The method according to claim 1, wherein part of the biometric authentication data is acquired by means of an on-site sensor device on the access control device.

9. A portable device having a user interface and a communication module for a wireless data communication, wherein reference data for an authentication is stored in a central data processing system, the reference data includes personal data containing biometric reference data for a user of the portable device and a device identifier for the portable device, comprising:
a processor; and
a storage medium having computer program instructions stored thereon, wherein the computer program instructions, when executed by the processor, perform processing of:
in response to a detected event, executing an authentication process in which the user is authenticated, wherein to authenticate the user, in the central data processing system, the reference data and authentication data are evaluated, which comprise personal authentication data for the user, including biometric authentication data, and an authentication device identifier for the portable device,
in response to a successful authentication, providing a location-restricted access code in the portable device, wherein the location-restricted access code is newly generated after each successful authentication;
evaluate the location-restricted access code by an access control device to determine an access authorization of the user to a particular physical locality, wherein the access authorization is independent from a communication link with a network at the particular physical locality; and
after a successful authentication at the particular locality and in response to detecting that the portable device departs from the particular physical locality, terminating validity of the location-restricted access code.

* * * * *